United States Patent
Drazic et al.

(10) Patent No.: US 8,111,320 B2
(45) Date of Patent: Feb. 7, 2012

(54) MULTI-IMAGE CAPTURE SYSTEM WITH IMPROVED DEPTH IMAGE RESOLUTION

(75) Inventors: Valter Drazic, Betton (FR); Thierry Borel, La Bouexiere (FR); Arno Schubert, Chevaigne (FR)

(73) Assignee: Thomson Licensing, Boulogne, Billancourt (FR)

( * ) Notice: Subject to any disclaimer, the term of this patent is extended or adjusted under 35 U.S.C. 154(b) by 0 days.

(21) Appl. No.: 12/737,071

(22) PCT Filed: May 28, 2009

(86) PCT No.: PCT/EP2009/056516
§ 371 (c)(1),
(2), (4) Date: Dec. 6, 2010

(87) PCT Pub. No.: WO2009/150061
PCT Pub. Date: Dec. 17, 2009

(65) Prior Publication Data
US 2011/0080491 A1    Apr. 7, 2011

(30) Foreign Application Priority Data

Jun. 10, 2008  (EP) .................................... 08305242

(51) Int. Cl.
*H04N 5/225* (2006.01)
*H04N 2/262* (2006.01)

(52) U.S. Cl. ................. 348/340; 348/222.1; 348/239

(58) Field of Classification Search .............. 348/222.1, 348/239, 340
See application file for complete search history.

(56) References Cited

U.S. PATENT DOCUMENTS

| | | | |
|---|---|---|---|
| 4,690,549 A | 9/1987 | Nakada | |
| 5,076,687 A | 12/1991 | Adelson | |
| 5,400,093 A * | 3/1995 | Timmers | 353/101 |
| 5,729,011 A * | 3/1998 | Sekiguchi | 250/226 |
| 7,620,309 B2 * | 11/2009 | Georgiev | 396/113 |
| 7,880,794 B2 * | 2/2011 | Yamagata et al. | 348/335 |
| 7,936,392 B2 * | 5/2011 | Ng et al. | 348/349 |
| 7,949,252 B1 * | 5/2011 | Georgiev | 396/334 |
| 7,956,924 B2 * | 6/2011 | Georgiev | 348/340 |
| 7,962,033 B2 * | 6/2011 | Georgiev et al. | 396/332 |
| 8,019,215 B2 * | 9/2011 | Georgiev et al. | 396/276 |
| 2005/0073603 A1 * | 4/2005 | Feldman et al. | 348/340 |

(Continued)

FOREIGN PATENT DOCUMENTS
DE    3018470    12/1981
(Continued)

OTHER PUBLICATIONS
Search Rept:Sep. 9, 2009.

*Primary Examiner* — Sinh Tran
*Assistant Examiner* — Selam Gebriel
(74) *Attorney, Agent, or Firm* — Jeffrey D. Carter

(57) ABSTRACT

The multi-image capture system comprises an imaging lens, a beamsplitter directing a first portion of light on an array of micro-imaging elements and a first photodetector array divided into a plurality of macropixels providing a set of depth images, and another portion of light on a second photodetector array 6 providing a main image with a resolution being higher than the resolution of each basic depth image. According to the invention, the resolution of the depth images is increased by using the image data of the main image.

4 Claims, 4 Drawing Sheets

U.S. PATENT DOCUMENTS

| | | | |
|---|---|---|---|
| 2005/0162539 A1* | 7/2005 | Brady et al. | 348/340 |
| 2006/0221209 A1 | 10/2006 | McGuire et al. | |
| 2007/0230944 A1 | 10/2007 | Georgiev | |
| 2008/0266468 A1* | 10/2008 | Cossairt et al. | 348/759 |
| 2009/0128669 A1* | 5/2009 | Ng et al. | 348/241 |
| 2009/0268970 A1* | 10/2009 | Babacan et al. | 382/232 |
| 2010/0013979 A1* | 1/2010 | Golub et al. | 348/340 |
| 2010/0020187 A1* | 1/2010 | Georgiev | 348/218.1 |

FOREIGN PATENT DOCUMENTS

| | | |
|---|---|---|
| WO | WO2006039486 | 4/2006 |

* cited by examiner

MULTI-IMAGE CAPTURE SYSTEM WITH IMPROVED DEPTH IMAGE RESOLUTION

This application claims the benefit, under 35 U.S.C. §365 of International Application PCT/EP2009/056516, filed May 28, 2009, which was published in accordance with PCT Article 21(2) on Dec. 17, 2009 in English and which claims the benefit of European patent application No. 08305242.3, filed Jun. 10, 2008.

TECHNICAL FIELD

The invention relates to plenoptic image capture devices that are able to provide a depth map of objects in an object field.

BACKGROUND ART

The document U.S. Pat. No. 5,076,687 discloses a multi-image capture system comprising:
  a converging lens able to receive light from objects in an object field and to direct said received light to an image field of the converging lens;
  a plurality of micro-lenses distributed about the image field of the converging lens such that each micro-lenses receives light from the converging lens and forms an image from the light it receives;
  a photodetector array divided into a plurality of macropixels each of which is subdivided into a plurality of pixels, each macropixel receiving an image formed by one of the micro-lenses such that each pixel of a macropixel receives light from one portion of the converging lens as imaged by one of the micro-lenses, each pixel being able to generate an image data indicative of the intensity of light incident upon it;
  and a data processor able to build a plurality of so-called "depth-images" of said objects in the object field, such that each image is built from image data generated by pixels having like spatial positions within the different macropixels of the photodetector array.

See also document DE 3018470 (SIEMENS) where the capture system comprises also a beamsplitter positioned on the optical path between the imaging lens and the array of micro-imaging elements to redirect a second portion of the light received from the imaging lens to a second image field (ref. 33) of the imaging lens.

See also document US 2006/221209 disclosing a tree diagram of acquisition of a plenoptic field originating from a scene, where nodes with multiple child nodes of this diagram represents beam splitters and leaf nodes represent image sensors.

The data processor is also able to compare the parallax between the different depth-images in order to determine depth of said objects in the object field.

Each depth image is representative of light passing through a different region of the converging lens, and then gives an image of the object field under a different angle of view.

Generally:
  there is one macropixel for each image generated by a micro-lens;
  each macropixel comprises the same number of pixels;
  in all macropixels, the pixels are spatially distributed similarly;
  the microlenses are arrayed in a rectangular lattice, corresponding to the format of each of the plurality of depth images.

In a different image capture device, U.S. Pat. No. 7,199,348 proposes also to use the parallax that has been determined between different views of a same object field to map the depth of the objects within this field.

As disclosed in U.S. Pat. No. 5,076,687, the number of pixels in each macropixel determines the number of different depth images though the converging lens of the multi-image capture system, and the number of microlenses determines the spatial resolution of these depth images.

Presently, the number of pixels in the photodetector array is a limitation for the spatial resolution of the depth map of the object field that can be obtained by comparing the parallax between the different depth-images. In the article entitled "Light Field Photography with a Hand-held Plenoptic Camera", authored by Ren Ng, Marc Levoy, Mathieu Brédif, Gene Duval, Mark Horowitz and Pat Hanrahan, published in the Standford Technical Report CTSR, on February 2005, a Kodak KAF-16802CE photodetector array of 4000×4000 pixels is used in conjunction with an array of 296×296 microlenses. But using such high resolution photodetector array is very expensive although the resolution of each of the depth image (i.e. 296×296) remains unacceptably low.

SUMMARY OF INVENTION

It is an object of the invention to improve the spatial resolution of the depth map without changing the number of pixels in the photodetector array.

For this purpose, the subject of the invention is a multi-image capture system comprising:
  an imaging lens able to receive light from objects in an object field and to direct a first portion of said received light to a first image field of the imaging lens;
  an array of micro-imaging elements distributed about the image field of the imaging lens such that each micro-imaging element receives light from the imaging lens and forms a partial image of said objects from the light it receives;
  a first photodetector array divided into a plurality of macropixels each of which is subdivided into a plurality of pixels, each macropixel receiving an image formed by one of the micro-imaging elements such that each pixel of a macropixel receives light from one portion of the imaging lens as imaged by one of the micro-imaging elements, each pixel being able to generate an image data indicative at least of the intensity of light incident upon it;
  and a data processor able to build a plurality of so-called basic "depth-images" of said objects in the object field, such that each basic depth-image is built from image data generated by pixels having like spatial positions within the different macropixels of the first photodetector array,
  a beamsplitter positioned on the optical path between the imaging lens and the array of micro-imaging elements to redirect at least a second portion of the light received from the imaging lens to at least a second image field of the imaging lens,
  at least one second photodetector array divided into a plurality of pixels receiving an image of said objects formed in the second image field, each pixel being able to generate an image data indicative at least of the intensity of light incident upon it;
  wherein said data processor is also able to build a so-called "main image" of said objects in the object field from image data generated by pixels of the at least second photodetector array.

As each basic depth-image is built from image data generated by pixels having like spatial positions within the different macropixels of the first photodetector array, it means that the number of pixels in each basic depth-image is equal to the number of macro-pixels within the first photodetector array.

Preferably, the number of pixels of the at least second photodetector array that are used to build said "main image" is superior to the number of macropixels of the first photodetector array that are used to build each basic depth image. It means that the basic resolution of the main image is superior to the basic resolution of each basic depth image.

Preferably, by using said main image, said data processor is also able to upconvert said basic depth images to upconverted depth images having a number of pixels superior to the number of macropixels of the first photodetector array. Consequently, it is possible to upscale the low resolution of the basic depth images by using the highest resolution of the main image.

Preferably, said data processor is also able assign a basic disparity map to each of said basic depth images. There are several known methods for determining a disparity map associated to a basic depth image, compared for instance to a central basic depth image. For instance, interrogation regions corresponding to different objects of a central basic depth image are selected, and candidate regions in the depth image are compared to the interrogation region. The candidate region which is most similar to the interrogation region is identified as a matching region. The location of the matching region within the depth image, relative to the location of the interrogation region within the central basic depth image, specifies the disparity for the interrogation region. Conventional correlation techniques are generally used for determining the similarity of a candidate region and an interrogation region.

Preferably, said data processor is also able to interpolate from any basic disparity map an interpolated disparity map having a higher resolution.

Preferably, said data processor is also able to calculate each upconverted depth image of a basic depth image from the main image and the interpolated disparity map associated with this basic depth image.

Preferably, said data processor is also able to compare the parallax between the different up-converted depth-images in order to determine depth of said objects in the object field. To determine this depth, a single baseline iterative registration algorithm can be used for instance to calculate the depth for each pixel element, as disclosed in the article entitled "An Iterative Image Registration Technique with an Application to Stereo Vision", by B. D. Lucas & Takeo Kanade, published in the Proceedings of Imaging Understanding Workshop, pp. 121-130 (1981), or a more precise algorithm using multi-baselines, as disclosed for example in the article entitled "Multi-Baseline Stereo using a Single-lens Camera", by M. Amtoun & B. Boufama, published in 2003 in the proceedings of the International Conference on Image Processing.

Preferably, in order to be able to compare the parallax between the different up-converted depth-images, said data processor is also able to perform, across said first image field, a plurality of local displacement estimates of image displacement between up-converted depth images.

As the resolution of the depth images has been increased by using the image data of the main image, the resolution of the depth map that is obtained is also advantageously increased.

With this at least dual channel principle where a portion of the visible light is directed toward a plenoptic photodetector array, and where another portion of the visible light is directed toward a classical high definition photodetector array, we have a way to shoot one full High Definition image, and with the help of that High Definition image, to calculate the depth map at full resolution for each image by interpolating the different views from the plenoptic channel. Hence, this is a way of delivering an image and its associated depth map with a plenoptic video system without sacrificing the resolution.

Preferably, the plurality of micro-imaging elements comprises an array of microlenses. The microlenses or the micro-imaging elements may be homogeneously distributed over the first photodetector array, or distributed as disclosed for instance in the document U.S. Pat. No. 6,137,535.

In summary, the multi-image capture system according to the invention comprises an imaging lens, a beamsplitter directing a first portion of light on an array of micro-imaging elements and a first photodetector array divided into a plurality of macropixels providing a set of depth images, and another portion of light on a second photodetector array providing a main image with a resolution being higher than the resolution of each basic depth image. According to the invention, the resolution of the depth images is increased by using the image data of the main image.

BRIEF DESCRIPTION OF DRAWINGS

The invention will be more clearly understood on reading the description which follows, given by way of non-limiting example and with reference to the appended figures in which.

The figures take no account of the scale of values so as to better reveal certain details, which would not be clearly apparent if the proportions had been respected.

DESCRIPTION OF EMBODIMENTS

Figure 1:
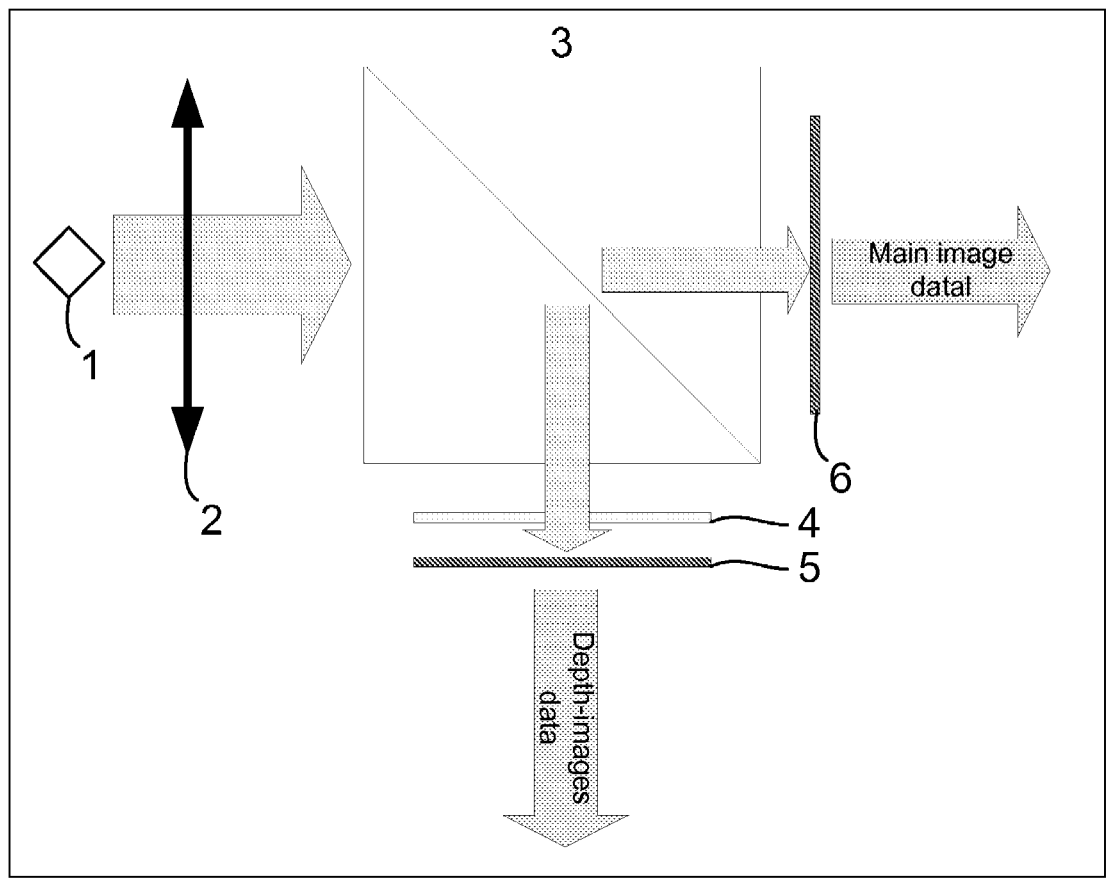
FIG. 1 is a schematic diagram of a multi-image capture system according to a main embodiment of the invention.

A main embodiment of the multi-image capture system according to the invention will now be described in reference to FIGS. 1 and 2. The multi-image capture system comprises:

an imaging lens 2 able to receive light from objects 1 in an object field and to direct a first portion of the received light to a first image field of the imaging lens through a first output of a beamsplitter 3, and to direct a second portion of the received light to a second image field of the imaging lens 2 through a second output of the beamsplitter 3;

an array 4 of micro-imaging elements 41 distributed about the image field of the imaging lens such that each micro-imaging element receives light from the imaging lens and forms a partial image of the objects 1 from the light it receives; each micro-imaging element 41 is generally a microlens; a combination of microlenses and prisms can also be used as described in US2007-230944.

a first photodetector array 5 divided into a plurality of macropixels 51 each of which is subdivided into a plurality of pixels 511, each macropixel receiving an image formed by one of the micro-imaging elements 41 such that each pixel of a macropixel receives light from one portion of the imaging lens as imaged by one of the micro-imaging elements;

a second photodetector array 6 divided into a plurality of pixels receiving an image of the objects 1 formed in the second image field;

the beamsplitter 3, already mentioned, which is then positioned on an optical path between the imaging lens 2 and the array 4 of micro-imaging elements, and also positioned on an optical path between the imaging lens 2 and the second photodetector array 6.

Figure 2:
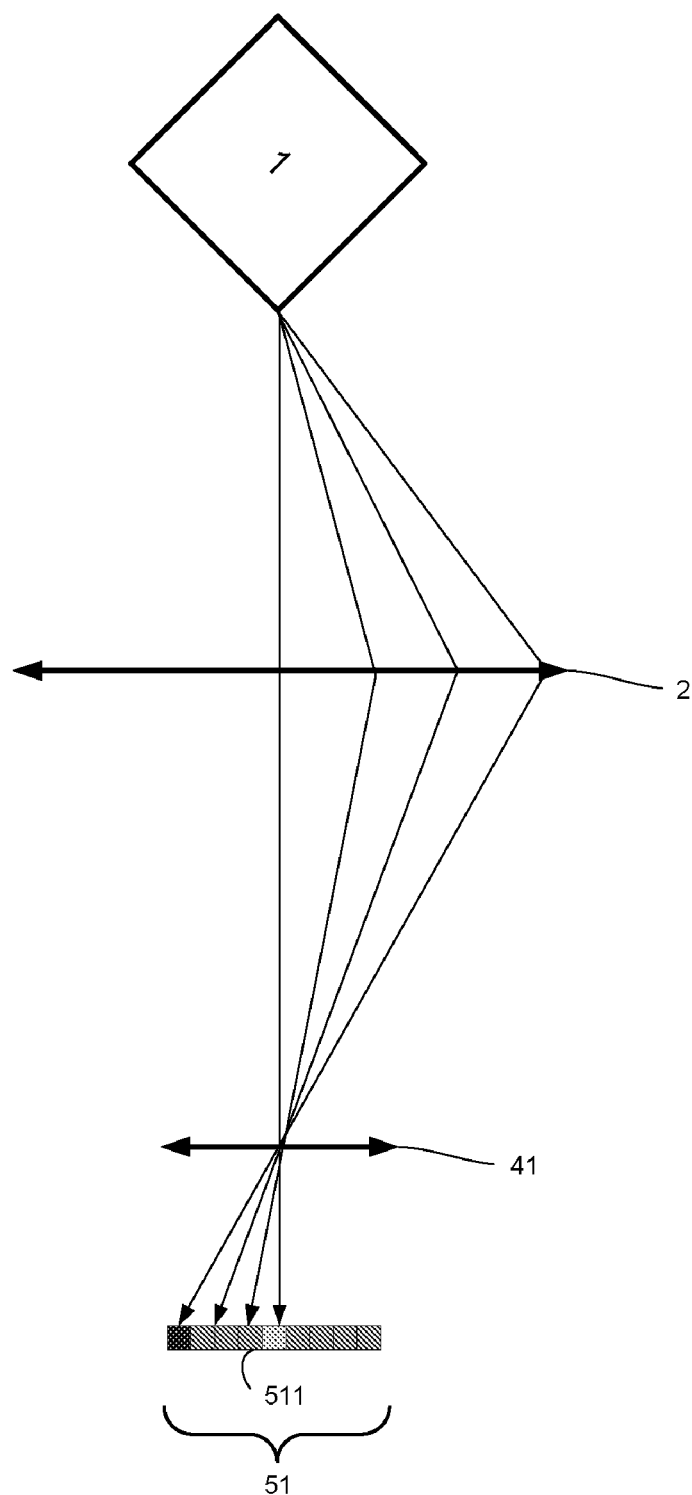
FIG. 2 illustrates the general principle of the plenoptic imaging which is used in the multi-image capture system of FIG. 1.

FIG. 2 illustrates how a point on an object 1, which is seen by the imaging lens 2 under different parallaxes, can be recorded on the first photodetector array 5 without averaging on all the directions of the incoming light rays. Each pixel 511 under the same micro-imaging element 41, i.e. belonging to the same macropixel, records the light rays coming from a different direction. The different spatial positions of the pixels within the same macropixel correspond to different directions of the incoming light rays.

In this specific embodiment, the first and the second photodetector arrays are CCD devices of 4000×2040 pixels. CMOS devices can be used instead. Each pixel is able to generate an image data indicative of the luminance and of the chrominance of light incident upon it. Each image data is then a usual RGB data in the device-dependant color space.

In this specific embodiment, the array 4 comprises 800× 680 micro-imaging elements; consequently, each macropixel of the second photodetector array comprises 5×3 pixels.

Figure 3:
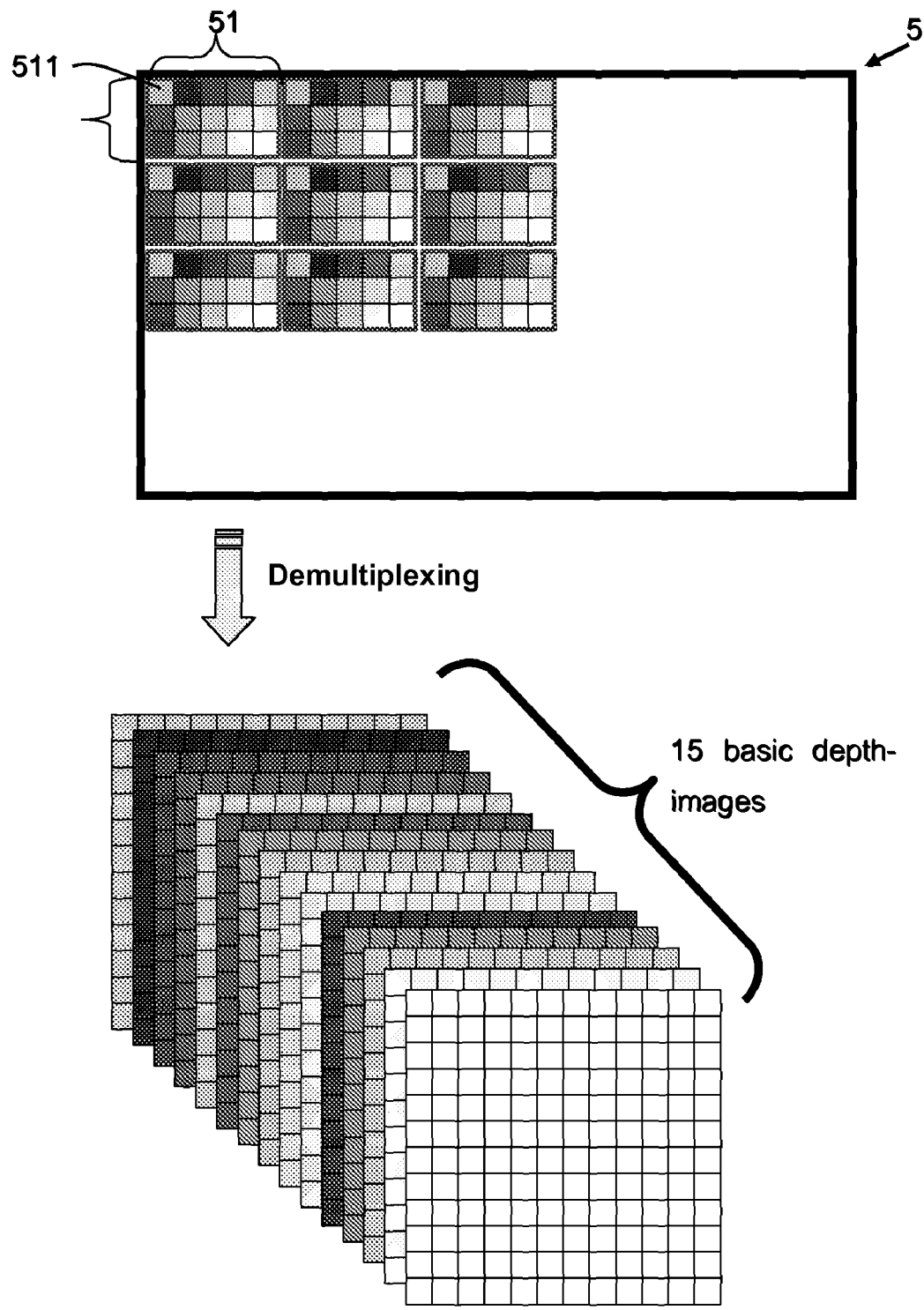
FIG. 3 illustrates the demultiplexing process that is implemented by the multi-image capture system of FIG. 1 to build a plurality of basic "depth-images" of the same objects 1 in an object field.

The multi-image capture system also comprises a data processor which is able:

to build a so-called "main image" of the objects 1 in the object field from image data generated by pixels of the second photodetector array 6; such a main image is provided in a manner known per se as in the most common color image capture device using CCD; the resolution of this main image is 4000×2040;

to build a plurality of so-called basic "depth-images" of the same objects 1 in the object field from image data generated by pixels of the first photodetector array 5, such that each basic depth-image is built from image data generated by pixels having like spatial positions within the different macropixels of the first photodetector array 5; as each macropixel comprises 5×3=15 pixels having different spatial positions within this macropixel, as the array 4 comprise 800×680 micro-imaging elements, 5×3=15 basic depth-images are then provided, each of them having a resolution of 800×680. As each individual pixel under one micro-imaging element records one specific parallax, a parallax demultiplexing is performed as disclosed in U.S. Pat. No. 5,076,687 by separating image data from the different pixels and concatenating into a single basic depth image all image data from pixels having like spatial positions within the different macropixels; such a demultiplexing process is illustrated on FIG. 3.

The angle of view of the main image is zero, corresponding to the average angle of view of the 15 basic depth images; the angle of view of the main image corresponds to the angle of view of the central basic depth image.

In this specific embodiment, the number of pixels 4000× 2040 of the second photodetector array that are used to build the "main image" is superior to the number of macropixels 800×680 of the first photodetector array; consequently, the resolution 800×680 of each of the basic depth images is far inferior to the resolution 4000×2040 of the main image.

We will now describe how the resolution of each of the depth images can be improved by using image data from the highest resolution main image.

Figure 4:
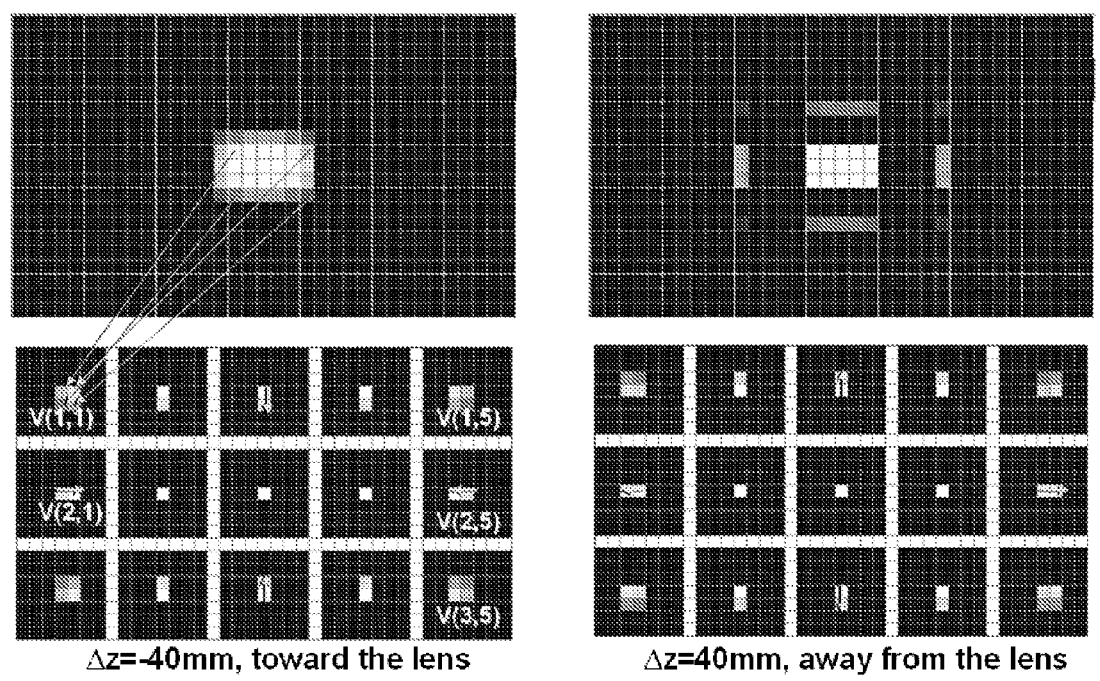
FIG. 4 illustrates how each basic depth image is a slightly non uniform shifted version of the central basic depth image or of the main image, all said images being provided by the multi-image capture system of FIG. 1.

Each basic depth image is a slightly non uniform shifted version of the central basic depth image or of the main image. By non uniform shifting, it is understood that point objects are shifted differently according to their relative position with respect to the focusing plane in the object field of the imaging lens 2. Points that are in the plane of focusing will map at the same spatial position within the different macropixels of the first photodetector array 5 in each basic depth image. If we now consider one particular basic depth image, other than the central one, objects of the object field that are in front of this focusing plane will undergo an opposite direction shift with respect to objects that are behind this focusing plane. Such a shift is illustrated on FIG. 4. On the left top part of this figure, an image of an object point that is located in front of the focusing plane is illustrated. On the right top part of this figure, an image of another object point that is located behind the plane of focusing is illustrated. In the bottom parts of this figure, the corresponding parallax de-multiplexed basic depth images are illustrated. One can see that, at the left bottom image number V(2,5), the image of that pixel is shifting toward left as it is indicated by the arrow. On the contrary, the same depth image V(2,5) on the bottom right part is shifting in the opposite direction.

Step 1: Disparity Estimation

According to the invention, the data processor is also adapted to calculate a basic disparity map associated with each basic depth image in reference to one of these basic depth images.

Let us consider two images with image data being ordered, as usual, by horizontal and vertical location. If a same object as an apple appears as a sub-image in both images, but at different locations in each, the disparity associated with the sub-image of the apple is the difference between these locations. Given similar sub-images of a same object in an object field, a basic disparity map can be constructed which specifies where each region of a first sub-image appears in a second sub-image, relative to the location of the region in the first sub-image.

Each basic depth image of the set of 15 basic depth images that is provided by the multi-image capture system according to the invention typically contains representations of many of the same objects as the other basic depth images. Although the objects are viewed from slightly different perspectives, the representation of each object is generally similar in all these basic depth images. Due to the effect of parallax, the position of each object is usually different in each basic depth image. By measuring the disparity associated with objects in the set of 15 basic depth images, the depth of those objects can be determined. By measuring the disparity associated with all small regions in the set of 15 basic depth images, a basic disparity map can be determined for each basic depth image.

Let us for instance take the central basic depth image V(2,3) as the reference basic depth image to calculate the disparities. Let us further take any single V' of the remaining 14 different depth images. Each pixel of V(2,3) can be found in V' by a block matching algorithm. It is found at the same coordinates if the object at that point is in focus, and shifted if it is not. The amount of shift is named "disparity". So that each depth image has all its 800×680 pixels assigned with a disparity.

There are several known methods for determining disparity from different sets of data, as, for instance, from different images. Generally, interrogation regions (=windows) of a predetermined size (see EP686942, U.S. Pat. No. 5,867,591)

or of a variable/adaptative size (see U.S. Pat. No. 6,141,440) are selected from a reference data set, as for instance from the central basic depth image, and candidate regions in a target data set, as for instance any other basic depth image, are compared to the interrogation region. The candidate region which is most similar to the interrogation region is identified as a matching region. The location of the matching region within the target data set, relative to the location of the interrogation region within the reference data set, specifies the disparity for the interrogation region. Conventional correlation techniques are generally used for determining the similarity of a candidate region and an interrogation region.

With known block matching algorithms (BMA), it is then possible to calculate the disparity for each pixel of the basic depth images, with a sub-pixel resolution of a quarter of a pixel size. According to the invention, a BMA is used to locate matching pixels in the set of 15 basic depth images for purpose of disparity estimation. Each basic depth image is then assigned with a basic disparity map. As the disparity is evaluated with a precision of a quarter of a pixel, it is sound to interpolate each basic depth image up to four times its original resolution of 800×680. The associated basic disparity map would still have a precision of one pixel.

Step 2: Upconversion of Each Depth Image to a Higher Resolution.

A disparity map of each basic depth image is then used to recalculate each depth image from the high resolution main image, then providing an upconverted depth image with a higher resolution. For such a recalculation, each image data corresponding to a pixel of the main image is shifted from the disparity associated with the same pixel in the basic depth image to upconvert.

But, as the number of pixels 4000×2040 of the second photodetector array that are used to build the "main image" is superior to the number of macropixels 800×680 of the first photodetector array that are used to build all basic depth images, only 800×680 pixels of the 4000×2040 pixels of the main image can be associated with a disparity value in each basic depth image.

To be able to associate each pixel of the main image with a disparity value for each basic depth image, an interpolation step should be added that is adapted to interpolate any disparity value associated to a pixel of the main image which has no correspondent in this basic depth image from disparity values associated to neighbored pixels of the main image which have correspondent in this basic depth image.

After this interpolation step, an interpolated disparity map is assigned to each basic depth image, having a resolution which is now identical to the resolution of the main image.

Each basic depth image is then recalculated into an upconverted depth image as follows: to each pixel of the main image is assigned a disparity value from the interpolated disparity map which is assigned to this basic depth image, and a new image data is calculated by shifting this pixel from the said disparity value.

The same process is repeated for each basic depth image, then providing a set of 15 upconverted depth images.

As illustrated above, the data processor is then also able to upconvert the basic depth images to upconverted depth images having a number of pixels superior to the number of macropixels of the first photodetector array, wherein this upconversion uses image data of the main image.

As a variant to the main embodiment of the invention as described above, the multi-image capture system may comprise, instead of only one second photodetector array 6 to build the main image, three photodetector arrays to build primary main images, one for each primary color as red, green and blue. The three primary main images are combined in a manner known per se to build the main image itself.

It can thus be appreciated that the present invention improves upon the prior art by providing a multi-image capture system allowing the improvement of the spatial resolution of the depth map without changing the number of pixels in the first photodetector array.

It will be understood that the present invention has been described purely by way of example, and modifications of detail can be made without departing from the scope of the invention.

Features disclosed in the description may, where appropriate, be implemented in hardware, software, or a combination of the two. Reference numerals appearing in the claims are by way of illustration only and shall have no limiting effect on the scope of the claims.

While the present invention is described with respect to particular examples and preferred embodiments, it is understood that the present invention is not limited to these examples and embodiments. The present invention as claimed therefore includes variations from the particular examples and preferred embodiments described herein, as will be apparent to one of skill in the art. While some of the specific embodiments may be described and claimed separately, it is understood that the various features of embodiments described and claimed herein may be used in combination.

The invention claimed is:

1. A multi-image capture system comprising:
an imaging lens able to receive light from objects in an object field and to direct a first portion of said received light to a first image field of the imaging lens;
an array of micro-imaging elements distributed about the image field of the imaging lens such that each micro-imaging element receives light from the imaging lens and forms a partial image of said objects from the light it receives;
a first photodetector array divided into a plurality of macropixels each of which is subdivided into a plurality of pixels, each macropixel receiving an image formed by one of the micro-imaging elements such that each pixel of a macropixel receives light from one portion of the imaging lens as imaged by one of the micro-imaging elements, each pixel being able to generate an image data indicative at least of the intensity of light incident upon it;
and a data processor able to build a plurality of basic depth-images of said objects in the object field, such that each basic depth-image is built from image data generated by pixels having like spatial positions within the different macropixels of the first photodetector array,
a beamsplitter positioned on the optical path between the imaging lens and the array of micro-imaging elements to redirect at least a second portion of the light received from the imaging lens to at least a second image field of the imaging lens,
at least one second photodetector array divided into a plurality of pixels receiving an image of said objects formed in the second image field, each pixel being able to generate an image data indicative at least of the intensity of light incident upon it;
wherein
said data processor is also able to build a main image of said objects in the object field from image data generated by pixels of the at least second photodetector array,
the number of pixels of the at least second photodetector array that are used to build said main image is superior to the number of macropixels of the first photodetector array that are used to build each basic depth image, by using said main image, said data processor is also able to upconvert said basic depth images to upconverted depth images having a number of pixels superior to the number of macropixels of the first photodetector array.

2. A multi-image capture system according to claim 1 wherein, for the upconversion of said basic depth images, said data processor is also able:

to assign a basic disparity map to each of said basic depth images, to interpolate from any basic disparity map an interpolated disparity map having a higher resolution, and to calculate each upconverted depth image of a basic depth image from the main image and from the interpolated disparity map associated with this basic depth image.

3. A multi-image capture system according to claim 2 wherein said data processor is also able to compare the parallax between the different up-converted depth-images in order to determine depth of said objects in the object field.

4. A multi-image capture system according claim 1, wherein the plurality of micro-imaging elements comprises an array of microlenses.

* * * * *